United States Patent [19]

Yamada et al.

[11] Patent Number: 4,892,371

[45] Date of Patent: Jan. 9, 1990

[54] SEMICONDUCTOR LASER ARRAY LIGHT SOURCE AND SCANNER

[75] Inventors: Kunio Yamada; Shigeru Tsukada, both of Kanagawa, Japan

[73] Assignee: Fuji Xerox Co., Ltd., Tokyo, Japan

[21] Appl. No.: 127,470

[22] Filed: Dec. 2, 1987

[30] Foreign Application Priority Data

Dec. 4, 1986 [JP] Japan ................................ 61-289652

[51] Int. Cl.$^4$ ........................ G02B 26/10; G02B 27/14

[52] U.S. Cl. ...................................... 350/6.8; 350/171; 350/174

[58] Field of Search ................. 350/6.8, 6.5, 171, 174, 350/6.7, 6.91, 173

[56] References Cited

U.S. PATENT DOCUMENTS 4,707,584 11/1987 Kimbara .............................. 350/174

4,728,965 3/1988 Kessler ............................... 350/174

FOREIGN PATENT DOCUMENTS 0030856 3/1979 Japan .................................. 350/174

29208 3/1981 Japan .

67375 4/1982 Japan .

0087527 5/1983 Japan .................................. 350/174

0160918 9/1983 Japan .................................. 350/6.8

0013215 1/1986 Japan .................................. 350/6.8

OTHER PUBLICATIONS

NASA Tech Briefs, Spring 1979, vol. 4, No. 1, p. 49.

*Primary Examiner*—Bruce Y. Arnold
*Assistant Examiner*—Ronald M. Kachmarik
*Attorney, Agent, or Firm*—Finnegan, Henderson, Farabow, Garrett and Dunner

[57] ABSTRACT

A semiconductor laser array light source and scanner is disclosed wherein a light source, such as a laser array, is utilized that emits one or more pairs of light beams. A collimating lens is provided to collimate each of the light beams and to direct each of the light beams along separate paths. Further, a combination of a tilting mirror and a beamsplitter are provided to bring each of the pairs of light beams into intersection with each other and to adjustably select the angle of divergence of the pairs of light beams after intersection and their divergence.

17 Claims, 3 Drawing Sheets

SEMICONDUCTOR LASER ARRAY LIGHT SOURCE AND SCANNER

FIELD OF THE INVENTION

The present invention relates to a light source using an integrated semiconductor laser array having a plurality of separated luminous points, and relates to a laser scanner using the same light source.

BACKGROUND OF THE INVENTION

In a generally-used laser printer, a picture is formed on a photosensitive material by a single light beam modulated by a picture signal. Also known is a multi-beam laser printer in which a plurality of scanning lines are simultaneously formed by a plurality of beams in order to perform high speed picture formation.

FIG. 1 is a diagram showing an example of the conventional multi-beam laser printer. In the drawing, a plurality of beams from a laser diode 1 as one body having a plurality of separated luminous points are irradiated on a rotary polyhedral mirror 23 after the luminous flux of the beams has been made parallel through a collimating lens 4. The plurality of beams are deflected by the rotary polyhedral mirror 23, and irradiated on a photosensitive material 25 through a fθ lens 24. A scanning initation detector 26 for detecting the scanning positions of the beams is provided at an end portion of the photosensitive material 25.

The beam spots on a surface of the rotary polyhedral mirror 23 are aligned at right angles to the main scanning direction as shown in FIG. 2. Therefore, the beam spots and loci thereof in multi-beam scanning, that is, scanning lines S, are formed on the photosensitive material 25 as shown in FIG. 3. Those scanning lines S form a picture, and an interval $a_1$ between adjacent scanning lines represents the resolution of the picture.

In the multi-beam laser printer as described above, the laser diode 1 having a plurality of separated luminous points is effectively used as a light source for supplying a picture output at a high speed in a laser printer or the like, because the laser diode 1 can act as a small-sized light source for generating a plurality of beams.

In the foregoing laser diode 1 having a plurality of separated luminous points, however, the intervals of the luminous points and the size of each luminous point cannot be desirably set because of drawbacks in semiconductor product producing techniques and thermal interference between the luminous points.

Therefore, there has been a limit in the spot size and in the beam interval on an irradiation surface of the photosensitive material 25. Consequently, there has been a limit in picture resolution.

In order to solve this problem, there has been proposed a multi-beam laser printer as disclosed in Japanese Patent Unexamined Publication Nos. 29208/1981 and 67375/1982, in which a laser diode 1 rotated through a fixed angle in the direction of an arrow A shown in FIG. 1 so that the alignment of the beam spots on a surface of a rotary polyhedral mirror 23 is inclined as shown in FIG. 4. By making the alignment of the beam spots inclined as described above, the intervals of the beam spots in the direction perpendicular to the main scanning are as shown in FIG. 5. As a result, the intervals $a_2$ of the scanning lines S on a photosensitive material 25 is less than the interval $a_1$ as shown in FIG. 3. The reduced interval $a_2$ improves the resolution of the picture.

The foregoing conventional technique, however, is disadvantageous in that the rotary polyhedral mirror 23 is enlarged in size, or in that an effective picture width is reduced or a picture is inclined which thereby causes a deterioration of picture quality.

Further, although there has been proposed a technique in which the intervals of the beam spots are reduced by using optical fibers, no multi-beam laser printer using such a proposed technique has been practically used because of a complicated arrangement thereof.

SUMMARY OF THE INVENTION

It is therefore an object of the present invention to overcome the foregoing disadvantages of conventional laser printers.

It is another object of the present invention to provide a semiconductor laser array light source in which the alignment angle and intervals of a plurality of beams can be set to a desired value.

It is a further object of the present invention to provide a semiconductor laser array light source in which the intervals of the beam spots on a photosensitive material are reduced so as to improve the resolution of a picture.

In order to attain the above objects, according to an aspect of the present invention, the semiconductor laser array light source comprises: a semiconductor laser array having a plurality of luminous points; a lens for condensing a plurality of beams from the semiconductor laser array; optical means having incident surfaces of angles different from each other and arranged to transmit and/or reflect certain ones of the plurality of beams incident onto one of the incident surfaces through the lens; and optical-path changing means for directing the other ones of the plurality of beams to the other incident surface of the optical means and for adjusting a relative arrangement of optical axes of the plurality of beams coming out of the optical means.

According to another aspect of the present invention, a scanner is provided for use in a laser printer wherein an integrated semiconductor laser provides a plurality of beams of light. The beams of light are associated in pairs of beams of light that each include a first beam and a second beam. The beams are scanned across a photosensitive material by a scanning mirror to expose a picture on the photosensitive material. Means are provided for collimating each of the plurality of beams of light and to direct each of the beams of light along separate paths. Means are also provided to bring each of the first and second beams of the pairs of beams of light into intersection with each other and for adjustably selecting the angle of divergence of the first and second beams after intersecting and for selecting the separation between the first and second beams.

According to still another aspect of the present invention, in a picture forming apparatus in which a plurality of beams from a semiconductor laser array having a plurality of luminous points are reflected by a reflector after passing through a converging lens. The plurality of beams from the reflector are focused on a photosensitive material through a fθ lens, and the laser scanner using a semiconductor laser array light source comprises optical means and optical-path changing means disposed between the lens and the reflector. The optical means has incident surfaces of angles different from each other and arranged to transmit and reflect certain ones of the plurality of beams incident onto one of the incident surfaces through the lens, and the optical-path changing means is arranged to lead the other ones of the plurality of beams to the other incident surface of the optical means and arranged to adjust a relative arrangement of optical axes of the plurality of beams coming out of the optical means.

In the semiconductor laser array light source according to the present invention, optical means, provided with incident surfaces having angles of incidence different from each other for transmitting and reflecting incident light, are used for ones of a plurality of beams and others of the plurality of beams are caused to be incident onto the respective incident surfaces. At this time, part of the plurality of beams is led onto one of the incident surfaces of the optical means by optical-path changing means which is adjustable in angle and position. Accordingly, the relative arrangement of the respective optical axes of the beams coming out from the optical means, that is, the inclination or the parallel displacement distance of the beams can be suitably set by suitably adjusting the inclination or position of the optical-path changing means. Therefore, if the optical-path changing means is adjusted so as to reduce the intervals of the beam spots on a photosensitive material, the intervals of scanning lines can be reduced to thereby improve the resolution of a picture.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENTS

Embodiments of the present invention will be described with reference to the accompanying drawings, hereunder. In the embodiments, items corresponding to those of the foregoing prior art examples are correspondingly referenced.

Figure 6:
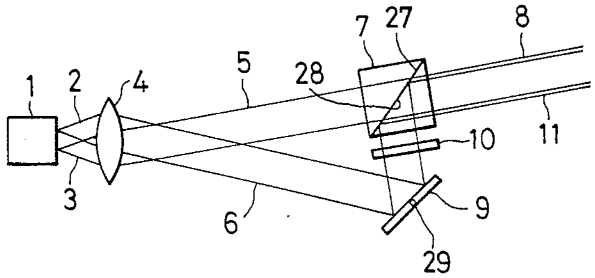
FIG. 6 is a diagram showing an embodiment of the semiconductor laser array light source according to the present invention.

FIG. 6 is a diagram showing an optical system of an embodiment of the semiconductor laser array light source according to the present invention.

In the drawing, two diverging light beams 2 and 3 are emitted from an integrated laser diode 1. The diverging light beams 2 and 3 pass through a collimating lens 4 that forms them into two collimated light beams 5 and 6, respectively, having different optical axes. In this case, each of the collimated beams 5 and 6 is plane polarized to form a P wave relative to a polarizing beam splitter 7. The convention is hereby adopted where the P component of polarization is the plane of vibration of the E wave (the electric field vector of a traveling wave) which is in the plane of the paper. The S component is the plane of vibration which is perpendicular to the plane of the paper.

One collimated beam 5 passes into the polarizing beam splitter 7 and falls incident its first incident surface 27, and passes through the beamsplitter 7 so as to be output light beam 8. The other collimated beam 6 is reflected by a folding mirror 9 and transmitted through a half wavelength plate 10 in which the direction of polarization of the collimated beam 6 is rotated by 90 degrees. The collimated beam 6 then passes as an S wave into the polarizing beam splitter 7 to fall incident on its second incident surface 28. The collimated beam 6 is substantially totally reflected by the second incident surface 28 of the polarizing beam splitter 7 and emerges as output light beam 11.

The positional relation between the output light beams 8 and 11, that is, the angle and parallel displacement distance between the output light beams 8 and 11, can be freely adjusted by the folding mirror 9. That is, by moving the mirror 9 with the angle of incidence of the collimated beam 6 thereon fixed, the displacement between the output light beams 8 and 11 can be suitably adjusted while maintaining the parallel relation therebetween. Further, by rotating the mirror 9 about a rotation axis 29 perpendicular to the paper plane of the drawing, the angle between the output light 8 and 11 can be suitably adjusted. Furthermore, the output light 8 and 11 can be perfectly superimposed one on the other if necessary. Thus, the displacement and angles between a plurality of beams can be suitably set by the foregoing adjustment.

Figure 7:
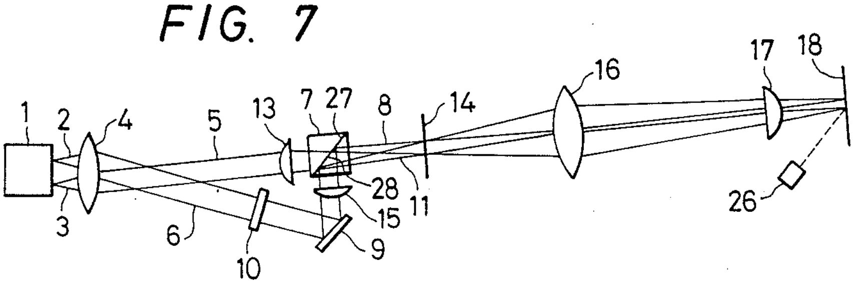
FIG. 7 is a diagram showing an embodiment of the laser scanner using the light source of FIG. 6 according to the present invention.

FIG. 7 is a diagram showing an embodiment of the laser scanner using the semiconductor laser array light source of FIG. 6 according to the present invention. In this embodiment, however, a half wavelength plate 10 is disposed between a collimating lens 4 and a mirror 9.

Cylindrical lenses 13 and 15 are disposed so that collimated beams 5 and 6 from a laser diode 1 converge to a reflection surface 14 of the rotary polyhedral mirror 23 (not shown in FIG. 7) (hereinafter, referred to as a rotary polyhedral mirror surface). In the drawing, in order to simplify the illustration of light paths, the rotary polyhedral mirror surface 14 is illustrated as transmitting the light beams 8 and 11 whereas in the actual practice of the invention they are reflected. A scanning initiation detector 26 is provided for detecting scanning positions of the collimated beams 5 and 6.

The collimated beams 5 and 6 which have been reflected by the rotary polyhedral mirror surface 14 are focused on a picture surface 18 of the photosensitive material 25 (not shown in FIG. 7) while being subject to convergence and $f\theta$ scanning correction by $f\theta$ lens 16 and a cylindrical lens 17, respectively.

When the collimated beams 5 and 6 are reflected by the rotary polyhedral mirror surface 14, if there is an error in inclination, that is, so-called surface-fall, of each rotary polyhedral mirror surface 14, the collimated beams 5 and 6 are displaced in the sub-scanning direction on the picture surface 18. As a result, the intervals of the scanning lines become irregular to thereby considerably deteriorate the picture quality. Accordingly, in this embodiment, the cylindrical lenses 13 and 15 and the cylindrical lens 17 are disposed so as to make the rotary polyhedral mirror surface 14 and the picture surface 18 optically conjugate with each other to thereby correct the surface-fall error of the rotary polyhedral mirror surface 14.

The scanning positions of the collimated beams 5 and 6 are detected by the scanning initiation detector 26, and the collimated beams 5 and 6 from the laser diode 1 are modulated by predetermined picture signals in synchronism with the scanning of the collimated beams 5 and 6, so that a plurality of scanning lines are formed on the picture surface 18 of the photosensitive material 25 by one scanning pass to thereby form a picture.

Figure 1:
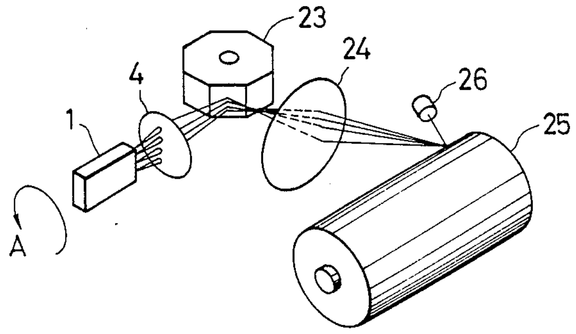
FIG. 1 PRIOR ART
FIG. 1 is a diagram showing an example of the conventional multi-beam laser printer.
Figure 2:
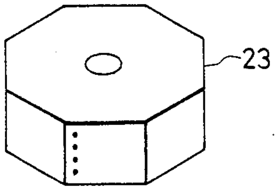
FIG. 2 PRIOR ART
FIG. 2 is a schematic perspective view showing the rotary polyhedral mirror in the case where luminous points are aligned at right angles to the main scanning direction.
Figure 4:
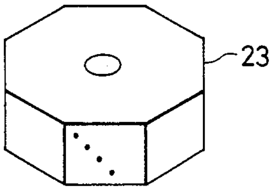
FIG. 4 PRIOR ART
FIG. 4 is a schematic perspective view showing the rotary polyhedral mirror in the case where luminous points are slantingly aligned relative to the main scanning direction.
Figure 3:
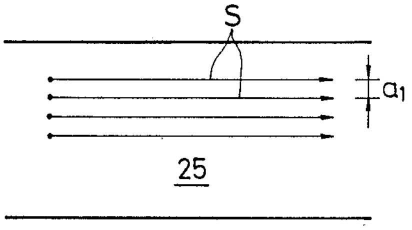
FIG. 3 PRIOR ART
FIG. 3 is a plan showing a picture on the photosensitive material in the case of FIG. 2.
Figure 5:
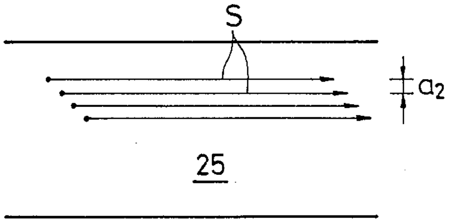
FIG. 5 PRIOR ART
FIG. 5 is a plan showing a picture on the photosensitive material in the case of FIG. 4.

In the embodiment of FIG. 7, by adjusting the folding mirror 9, it is possible to adjust the angle and parallel displacement distance between output light beams 8 and 11 coming out from a polarizing beam splitter 7. Therefore, the intervals of the beam spots on the picture surface 18 of the photosensitive material 25 (in FIG. 1) can be suitably set independently of the intervals of the luminous points of the laser diode 1. As a result, the intervals of the scanning lines can be reduced, so that high resolution can be obtained.

In this embodiment, the luminous points of the laser diode 1 are not slantingly aligned relative to the photosensitive material 25, so that deterioration of resolution due to inclination of the cross section of each beam spot is reduced.

Figure 8:
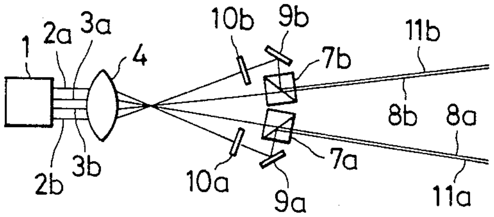
FIG. 8 is a diagram showing another embodiment of the semiconductor laser array light source according to the present invention.

FIG. 8 is a diagram showing an optical system of another embodiment of the semiconductor laser array light source according to the present invention.

In this case, a laser diode 1 is provided with four luminous points. The arrangement of the embodiment of FIG. 8 is the same as that of the embodiment of FIG. 6, except that half wavelength plates 10*a* and 10*b* are disposed at the laser diode 1 side of mirrors 9*a* and 9*b*, that is, behind the mirrors 9*a* and 9*b* with respect to the traveling direction of the collimated beams 5 and 6, respectively. In the drawing, only the optical axes are illustrated with respect to the respective beams.

Output light 2*a*, 3*a*, 2*b*, and 3*b* from the laser diode 1 are grouped into two sets, one set consisting of the output light 2*a* and 3*a* and the other set consisting of the output light 2*b* and 3*b*. The optical paths of the one set of output light 2*a* and 3*a* and the other set of output light 2*b* and 3*b* are adjusted through polarizing beam splitters 7*a* and 7*b*, the mirrors 9*a* and 9*b*, and the half wavelength plates 10*a* and 10*b* respectively for each group in the same manner as the embodiment of FIG. 6. Resultant output light beam pair 11*a* and 8*a* and output light beam pair 11*b* and 8*b* emanate from beam splitters 7*a* and 7*b*, respectively.

Figure 9:
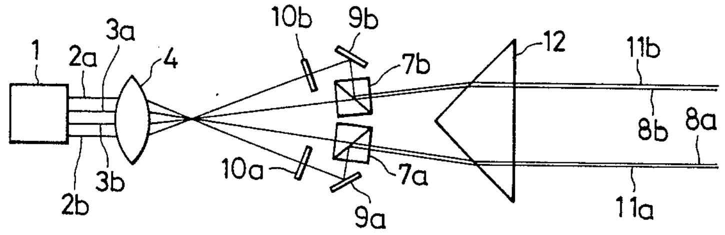
FIG. 9 is a diagram showing a further embodiment of the semiconductor laser array light source according to the present invention.

FIG. 9 is a diagram showing a further embodiment of the semiconductor laser light source according to the present invention, in which a prism 12 is inserted in the respective light paths of the output light beam pair 8*a* and 11*a* and the output light beam pair 8*b* and 11*b* in the case of FIG. 8 so as to make the output light beam pair 8*a* and 11*a* and the output light beam pair 8*b* and 11*b* parallel with each other.

Figure 10:
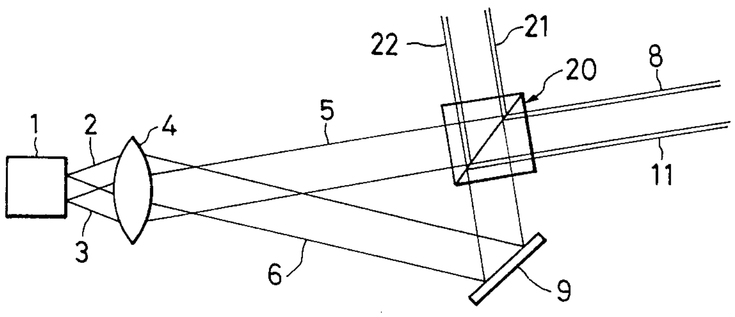
FIG. 10 is a diagram showing a still further embodiment of the semiconductor laser array light source using the half mirror according to the present invention.

FIG. 10 shows a still further embodiment of the present invention, in which a half mirror 20 is used in place of the half-wave plate 10 and the polarizing beam splitter 7 of FIG. 6. In this embodiment, a part of a collimated beam 5 is passed through the half mirror 20 so as to form output light beam 8, and another part of the collimated beam 5 is reflected by the half mirror 20 so as to form output light beam 21. Further, a part of a collimated beam 6 reflected by a mirror 9 is passed through the half mirror 20 as to form output light beam 22, and another part of the collimated beam 6 is reflected by the half mirror 20 so as to form output light beam 11. That is, the four output light beams 8, 11, 21, and 22 are obtained from the two parallel beams 5 and 6.

Also in this embodiment, the angular and displacement relations between both pairs of output light beams 8 and 11 and between the output light 21 and 22 can be adjusted by adjusting the mirror 9.

Although a semiconductor laser is described in the foregoing embodiments, the present invention is not limited to this, but any source of linearly polarized light having a plurality of separated luminous points can be used.

As described above, according to the present invention, by the adjustment of the respective optical paths of a plurality of beams incident into different surfaces of the optical means, such as the beam splitter or the like for transmitting and/or reflecting incident light, the relative angles and intervals between the optical axes of a plurality of beams coming out of the optical means can be suitably adjusted and set.

Accordingly, the intervals of scanning lines on a photosensitive material can be reduced independently of the intervals of the luminous points of the semiconductor laser array. Therefore, the present invention can easily increase the resolution of a picture.

It will be apparent to those skilled in the art to which the present invention pertains that modifications and variations can be made in the semiconductor laser array light source and laser scanner of the present invention without departing from the scope or spirit of the invention, as defined by the appended claims and equivalents thereof.

What is claimed is:

1. A semiconductor laser array light source comprising:

semiconductor laser array means having a plurality of luminous points;

lens means for condensing a plurality of beams emanating from said semiconductor laser array means and for directing the plurality of beams along a plurality of optical paths;

optical means having first and second incident surfaces having first and second angles of incidence, respectively, different from each other, said first incident surface transmitting one of said plurality of beams incident thereon; and optical-path changing means for directing a second of said plurality of beams to said second incident surface of said optical means and for adjusting a relative arrangement of optical axis of said plurality of beams emanating from said optical means.

2. A semiconductor laser array light source of claim 1, wherein said optical means includes a polarizing beam splitter and a half wavelength plate disposed in one of the respective optical paths of said plurality of beams to be incident to said polarizing beam splitter.

3. A semiconductor laser array light source of claim 1, wherein said optical means comprises a half mirror.

4. A light source as claimed in claim 1, wherein said first surface of said optical means transmits part of the first beam and reflects part of the first beam and said second surface of said optical means reflects part of the second beam and transmits part of the second beam.

5. A laser scanner, comprising:

a semiconductor laser array having a plurality of luminous points;

a lens means for condensing a plurality of beams emanating from said semiconductor laser array and for directing the plurality of beams along a plurality of optical paths;

optical means having first and second incident surfaces having first and second angles of incidence, respectively, different from each other, said first incident surface transmitting one of said plurality of beams incident thereon;

optical-path changing means for directing said second of said plurality of beams to said second incident surface of said optical means and for adjusting a relative arrangement of optical axes of said plurality of beams emanating from said optical means;

deflection means for deflecting said plurality of beams; and fθ lens means for focusing said plurality of beams onto a photosensitive material.

6. A laser scanner of claim 5, wherein said optical means comprises a polarizing beam splitter and a half wavelength plate disposed in one of the respective optical paths of said plurality of beams to be incident to said polarizing beam splitter.

7. A laser scanner of claim 5, wherein said optical means comprises a half mirror.

8. A scanner as claimed in claim 5, wherein said deflection means includes a scanning mirror to direct light emanating from the luminous points to a photosensitive material.

9. A scanner as claimed in claim 8 wherein the scanning mirror and the photosensitive material are optically conjugate.

10. A scanner as claimed in claim 9, further including:

a first cylindrical lens disposed between said optical means and said lens means for focusing the first beam on the scanning mirror;

a second cylindrical lens disposed between said optical means and said lens means for focusing the second beam on the scanning mirror; and a third cylindrical lens disposed between said fθ lens means and the photosensitive material.

11. A scanner for use in a laser printer, wherein a semiconductor laser array provides a plurality of beam of light, the beams of light being associated in first and second pairs of beams of light, each of said pairs of beams of light including a first beam and a second beam, the beams being scanned across a photosensitive material by a scanning mirror to expose a picture on the photosensitive material, comprising:

lens means for collimating each of the plurality of beams of light and for directing each of the beams of light along separate paths to make the optical axes of the beams different from one another;

first and second optical means, each of said optical means having first and second incident surfaces having first and second angles of incidence, respectively, different from each other, said first incident surfaces of said first and second optical means transmitting the first beams of said first and second pairs of beams incident thereon, said second incident surfaces of said first and second optical means reflecting the second beams of said first and second pairs of beams incident thereon; and optical-path changing means for directing the second beams of said first and second pairs of beams to said second incident surfaces of said first and second optical means and for adjusting relative arrangements of optical axes of said first and second beams of said first and second pairs of beams emanating from said first and second optical means.

12. A scanner as claimed in claim 11 wherein said first and second optical means includes:

first and second beam splitters each having a first surface and a second surface wherein the first beams of said pairs of beams are incident on the first surfaces and the second beams of said pairs of beams are incident on the second surfaces; and wherein said optical-path changing means includes first and second mirrors disposed between said lens means and said first and second optical means, respectively, said first and second mirrors being movable and rotatable relative to said first and second beams splitters, respectively, the second beams of said first and second pairs of beams being incident on said first and second mirrors, respectively.

13. A scanner as claimed in claim 12 wherein said first surfaces of said first and second beam splitters transmit substantially all of the first beams of the first and second pairs of beams through said first and second beam splitters, and said second surfaces of said first and second beam splitter reflect substantially all of the second beams of said first and second pairs of beams.

14. A scanner as claimed in claim 11 further including means to rotate the planes of polarization of the second beams of said first and second pairs.

15. A scanner as claimed in claim 11 that further includes means to detect the positions of the beams incident on the photosensitive surface.

16. A scanner as claimed in claim 11 further including means for bringing each of the pairs of beams emerging from the optical means into parallel with each other.

17. A scanner as claimed in claim 11, wherein said optical means brings each of the collimated first and second beams in the pair of beams of light into intersection with each other, said optical-path changing means adjustably selecting the angle of divergence of the pairs of the beams after their intersection.

* * * * *